United States Patent [19]

Sheridan

[11] 3,934,309
[45] Jan. 27, 1976

[54] ZONE REGULATION OF CASING INFLATION GAS

[75] Inventor: Arthur L. Sheridan, Woodridge, Ill.

[73] Assignee: Union Carbide Corporation, New York, N.Y.

[22] Filed: June 28, 1974

[21] Appl. No.: 484,207

[52] U.S. Cl. ............................. 17/42; 17/49; 17/51
[51] Int. Cl.² ........................................ A22C 11/00
[58] Field of Search ............... 17/35, 33, 34, 42, 49, 17/51

[56] References Cited
UNITED STATES PATENTS

| | | | |
|---|---|---|---|
| 3,590,422 | 7/1971 | Matecki | 17/42 |
| 3,631,566 | 1/1972 | Dhuysser | 17/42 |
| 3,745,610 | 7/1973 | Urbutis | 17/51 |

Primary Examiner—Anton O. Oechsle
Attorney, Agent, or Firm—Maurice W. Ryan

[57] ABSTRACT

Inflation gas pressure interior of a flexible tubing, such as a food casing, advancing continuously through multiple sequential production and processing zones, is selectably controlled as between two adajacent zones by defining an intermediate zone in the form of an inflated bubble trapped in the tubing between two nip rolls co-acting against a larger smooth surfaced backing roll, through which inflation gas is selectably bled from one zone to the other.

5 Claims, 6 Drawing Figures

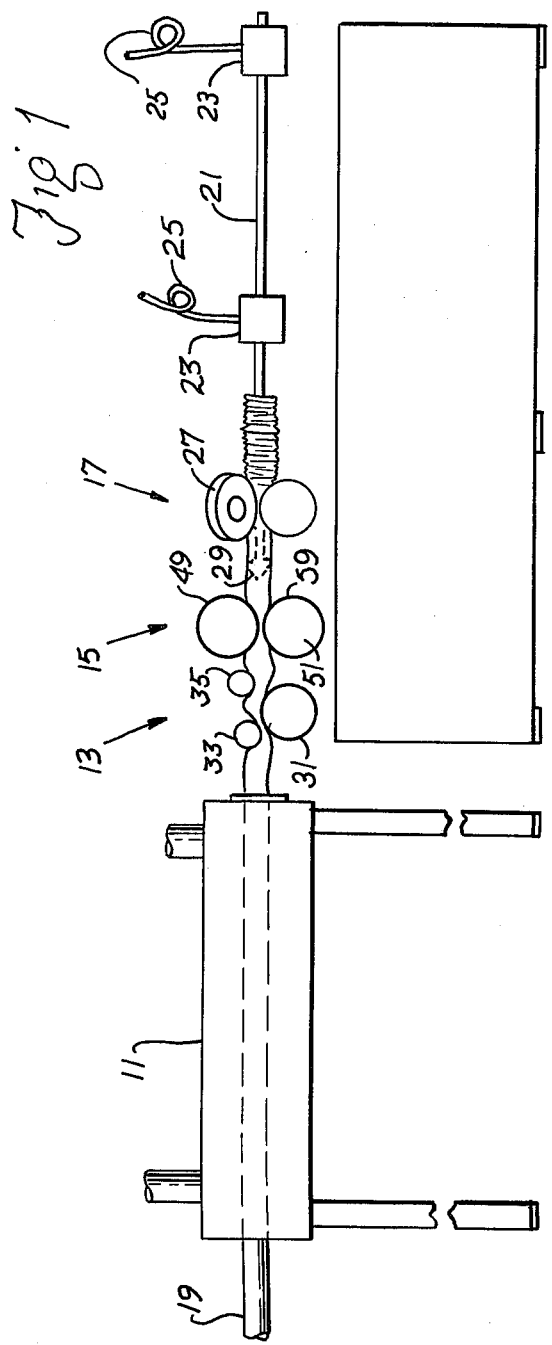
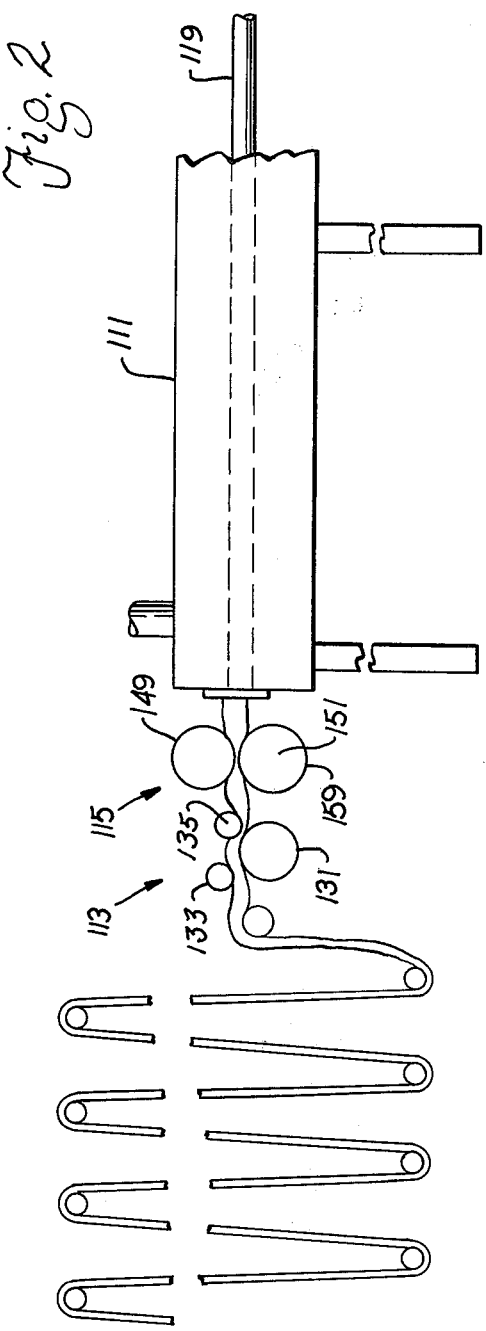

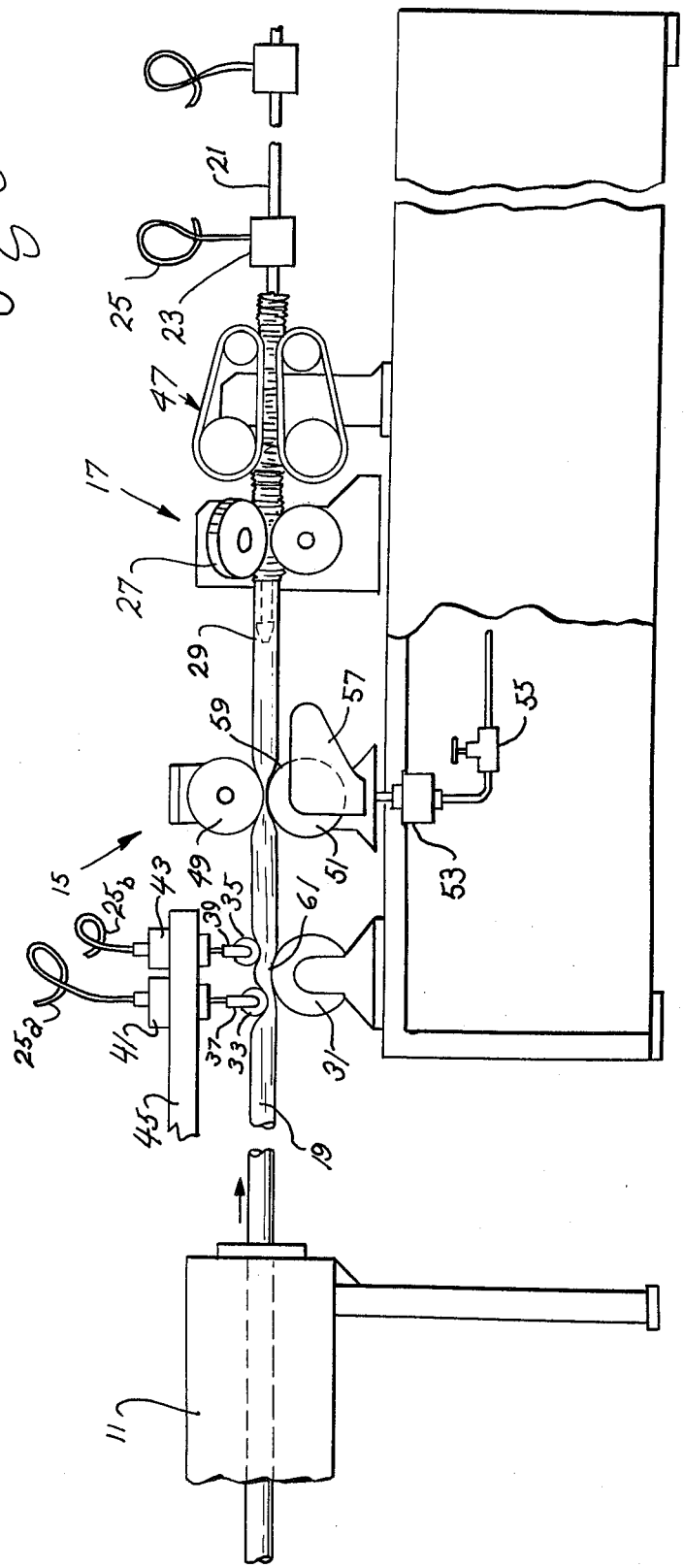

ZONE REGULATION OF CASING INFLATION GAS

This invention relates to the production of sausage casings and more particularly to an improved method and apparatus for processing a just-fabricated continuous length of extruded tubing, either edible or inedible, which is to be used as a casing in sausage product manufacturing.

The production of sausage products such as frankfurters and the like historically has involved the use of animal intestines as sausage casing material. Edible natural casings obtained from animal intestines have many obvious disadvantages in present day high speed, highly automated sausage manufacturing techniques, the more salient disadvantages being inherent variations in size, physical integrity, and facile comestibility. Such natural casings also are rather difficult to clean and to prepare by mechanical means for human consumption.

A significant departure from the use of natural animal intestine casing occurred in the sausage making industry with the development of so-called skinless frankfurters which involve the use of synthetic casing materials. The synthetic casing materials used to make skinless frankfurters are inedible and are therefore slit and peeled from the finished sausage product and discarded before product final packaging. Typically, cellulose frankfurter casings for use in skinless frankfurter production are manufactured in continuous tubular lengths starting with an extrusion step. The continuously extruded tubing length is inflated, directed through a series of chemical and physical treatments, is dried, flattened, and rolled up on reels for transport to a shirring station. At the shirring station, the tubing is dereeled, reinflated, shirred, and compressed on a shirring machine to obtain relatively rigid tubular elements known in the industry and supplied to sausage makers as shirred casing sticks.

In the sausage manufacturing process, the sticks are successively manually or automatically fitted, one at a time, over a stuffing horn which feeds or stuffs meat emulsion into the casing. As the casing fills with the meat emulsion, it deshirrs and extends longitudinally to the original casing length. During the stuffing step, pre-selected lengths of filled casing may be tied off, twisted, or otherwise circumferentially diminished to form sausage links. The continuous stuffed lengths in link form are then further processed by cooking, smoking, curing and the like steps, depending on the requirements of the product being made. The casing is removed and discarded prior to final packaging of the sausage product.

Certain sausage products, however, are still the more advantageously made with a casing which is not discarded and which is edible. Highly satisfactory edible sausage casings produced from protein sources such as reconstituted animal collagen have been developed. A suitable thin-walled casing is obtained by extruding a collagen mass into the form of a continuous tubing which is then passed through one or more chemical treatment baths, drying steps, and similar treatments. The thus prepared collagen tubing casing is dried, shirred into casing sticks, severed into pre-selected lengths, packaged, and delivered to the sausage makers in much the same way as the cellulose casing sticks. The collagen casings are tender, readily cookable, and edible with the sausage stuffing emulsion material. The stirred casing or stick, comprising as it may a length of up to 50 meters or more of 0.0254 millimeter wall thickness material, such as cellulose, with a tubular diameter most usually in the order of 26 millimeters shirred and compressed to a length of about 50 centimeters, is, it will be readily appreciated, a relatively fragile structure. Since the feeding of sticks on to the horn of the stuffing machine is most frequently an automatic operation involving the positioning of each stick in turn on the stuffing horn from a supply hopper, any structural irregularity in the stick can cause a malfunction with consequent shutdown and loss of production time on the stuffing machine.

One of the most critical factors in making the sticks is the precision of the shirring operation. Careful and precise shirring steps are therefore of critical moment in the manufacture of the non-edible casing sticks, but are of even greater criticality in the manufacture of the more fragile edible collagen sticks.

In order to accomplish proper and effective shirring and to permit the shirring elements of the shirring machine to grip the advancing tubing and form pleats therein, the tubing is inflated to a condition where the tubing wall attains a suitable degree of rigidity and stiffness. Inflating a tubing from a hollow shirring mandrel is well known in the art of making cellulose casing. The equivalent process at this step of production of collagen tubing is, however, a much more delicate operation. Due to the fact that the freshly made collagen tubing is fragile, weak, and somewhat porous, and is not easily collapsible to a flat condition without the peril of damage, the extrusion, chemical treatment, sizing, drying, and shirring operations are customarily and advantageously performed in one continuous process. The tubing inflation gas, air for example, may, as in the process step of shirring cellulose tubing, be supplied to the tubing from a hollow shirring mandrel used in the process, but the pressure of the inflation air must be maintained relatively low in all zones of the production process except the shirring step. Thus, the production of edible collagen sausage casings presents the problem of the need for a relatively low pressure inflation gas throughout most of the production steps while, at the same time, the requirement of a relatively higher inflation gas pressure for the shirring operation which is involved in the final production steps. At the time of shirring the collagen casing it is relatively dry, has a much higher degree of mechanical strength and physical integrity than it had in the course of its progress as a fragile, weak, wet, and porous tubing through the process steps preceding shirring, and thus a relatively higher casing inflation pressure may therefore be safely used.

Here it should be noted, that while the method and apparatus of the present invention was initially developed for use in collagen casing production, it is intended that this invention is equally and as advantageously applicable to other types of tubing, cellulose for instance, where, for one reason or another, it is necessary to use relatively low pressure inflation in one of the production phases and a relatively high inflation pressure in a contiguous phase.

A wet extruded collagen tubing is usually inflated to a low gas pressure of up to about 1 to 2 inches water column. While this pressure is satisfactory for the sizing and the drying steps, it is inadequate for shirring. Tubing shirred at such a low pressure, particularly collagen tubing, cannot be made to attain that degree of wall rigidity and stiffness necessary to effect properly firm contact with the shirring elements and the resulting sticks produced are limp, non-uniform, and non-coherent, a highly unsatisfactory product.

In the production of collagen tubing, the inflation pressure for the tubing in the drying zone is usually no greater than about 1 inch water column, while the inflation pressure for the tubing in the shirring zone may be as high as up to about 135 inches water column. The pressure differential may be within the range of from about 135:1 to about 20:1 with a preferred range of from about 80:1 to about 40:1. The inflation pressure, however, depends on the speed of the continuously advancing tubing. For example, at a tubing speed of 15 feet per minute, if the tubing inflation pressure in the drying zone is, for example, about 1 inch water column, the pressure in the shirring zone may be 80 inches water column, i.e., a pressure differential of 80:1. If the casing speed is doubled to 30 feet per minute, the inflation pressure will preferably be about 2 inches water column in the drying zone, while it may remain at 80 inches water column in the zone of shirring, a pressure differential of 40:1.

The problem may thus be succinctly stated as a need to selectably control and regulate casing inflation gas pressures to obtain discrete requisite pressures in different zones of the casing production process.

In copending application Ser. No. 468,105 filed May 8, 1974, assigned to the same assignee as this application, there is described an invention which provides a solution to this problem by the use of paired nip rolls, at least one of which is provided with transverse alternate lands and grooves on its circumferential surface so as to form a continuous succession of gas trapping chambers which pass trapped gas from one zone to another. While this paired nip roll technique provides a significant advance in the art, a nice solution to the problems hereinbefore described, and, to some extent, the features and advantages hereinafter mentioned, the present invention provides not only all of these to an even greater extent but additional features and advantages, and, more importantly, makes available a broader pressure differential control.

In order to simplify the discussion, the description will refer mainly to collagen tubing.

With this then being the state of the art, the present invention was conceived and developed to provide a selectably controllable inflation gas system which will maintain a desired pressure differential between two adjacent zones in flexible tubing as the tubing moves continuously unidirectionally from one of the zones to the other.

The invention more specifically provides a system for inter-zone regulation of flexible food casing inflation gas pressure requiring only a single inflation gas source and feed point.

A further feature and advantage of the invention is its provision of a tubing production zone pressure regulating system which is adaptable to maintain an inflation gas pressure differential between two adjacent zones irrespective of which of the zones includes the gas supply input.

Another and important feature of the invention is that it permits the continuous high speed production techniques hitherto practically workable only in conventional cellulose casing production to be readily adapted to the continuous in-line production of the more fragile and difficult to handle casings, particularly collagen casings.

Still another important and more specific attribute of the invention is that it obviates the inflation pressure problems attending collagen casing production by providing for relatively low inflation pressures throughout most of the production steps and relatively high inflation pressure for the shirring operation.

These and other features and advantages of the invention will be more readily understood and appreciated from the ensuing more detailed description and from the drawings, whrein:

FIG. 1 is a schematic drawing of part of a food casing production machinery system, showing apparatus according to the present invention installed between a low pressure drying zone and a high pressure shirring zone;

FIG. 2 is a schematic drawing of part of a food casing production machinery system showing apparatus according to the present invention installed between a low pressure wet treatment zone and a relatively higher pressure drying zone;

FIG. 3 is a side elevation of an apparatus arrangement similar to that shown schematically in FIG. 1, showing details of apparatus according to the invention;

Figure 4:
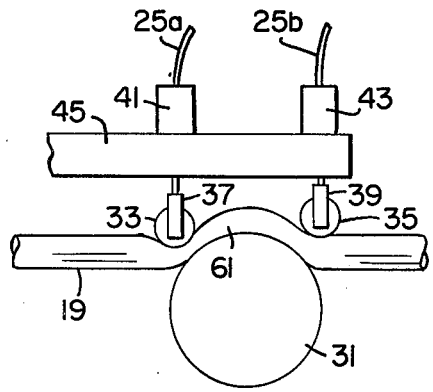
FIGS. 4, 5 and 6 are detailed schematic views of apparatus according to the invention illustrating operational sequences.

In general, the present invention comprehends in a system for the production of flexible film tubing which system including means for continuously introducing an inflation gas into the interior of the tubing and means for continuously unidirectionally advancing the tubing from a first zone to a second zone, apparatus to maintain a preselected inflation gas pressure differential between the first zone and the second zone comprising, in combination: a base roll in contact with the tubing; a first nip roll disposed in first tubing nipping relationship relative to said base roll; a second nip roll disposed in second tubing nipping relationship relative to said base roll and spacedly adjacent to said first nip roll; means to selectably vary the tubing nipping relationship between the first nip roll and the base roll; and means to selectably vary the tubing nipping relationship between the second nip roll and the base roll; whereby a continuous succession of selectably variable volume inflation gas accumulation chambers is formed in the advancing tubing between the base roll and the first and second nip rolls, and successive inflation gas quantities in said accumulation chambers are passed from one of said zones to the other.

FIG. 1 shows a portion of a collagen casing production apparatus comprising a dryer 11, a pressure regulating station 13, a metering roll assembly 15, and a shirring station 17. A casing 19, in process, advances from left to right in FIG. 1, leaving the dryer 11 at a low inflation gas pressure, passing through the pressure regulating station 13 into a zone of high inflation gas pressure, and then passing through the metering roll assembly 15 to the shirring station 17, where a shirring head 27 of conventional construction shirrs the casing 19 on a shirrng mandrel 21 into the pleated or shirred condition shown immediately to the right of the shirring station in drawing FIG. 1. Inflation gas, usually air, at a high pressure required for the shirring operation, is supplied to the shirring mandrel 21 by means of periodically applied C clamp type inflator blocks 23 connected to an air supply source 25. Between sequential introductions of inflation air into the mandrel 21, the inflator blocks 23 retract clear of the mandrel 21 surface to permit the shirred casing 19 to pass on along the mandrel for severing, compacting, and removal as discrete sticks.

The primary function of the metering roll assembly 15 is to feed the casing at controllable speed into the shirring head 27. The metering rolls thus effect relatively high firm nip pressures and tend to completely tightly flatten the advancing casing. Since this complete nipping action would otherwise effectively prevent the inflation air from emanating from the tip 29 of the shirring mandrel 21, one of the metering rolls is provided with a continuous circumferential recess or groove 59 which permits expansion thereinto of the flattened nipped casing, forming a passage to accommodate air flow through the metering roll assembly 15. The metering roll assembly may also be advantageously adapted to shift selectably to a non-grooved mode of nip operation wherein the casing is sealed off completely against air flow. This enables seal-off of the low inflation pressure zone to allow for start-ups, repairs to the shirring apparatus, and other maintenance procedures.

In FIGS. 1 and 3 of the drawings, the pressure regulating station 13 comprises a base roll 31 rotatably mounted to effect tangential contact with the underside of the advancing casing 19, a first nip roll 33, and a second nip roll 35 respectively mounted rotatably to effect selectably variable casing nipping contact with the base roll 31. The base roll 31 rotates clockwise in the illustrated embodiments and the first and second nip rolls rotate counterclockwise. Base roll 31 may, in certain particular applications be an idler roll, but in the illustrated and preferred embodiments it is a driven roll powered by conventional means not shown, the advancing motion imparted to the casing in process being consonant with the advancing motion imparted thereto by the metering roll assembly 15. As shown in FIG. 3, the nip rolls 33, 35 are mounted rotatably respectively in yokes 37, 39 which are attached to rods extending from air actuated reciprocally movable pistons in pneumatic activators 41, 43. The entire nip roll assembly is supported on a suitable bracket 45. Air supply sources 25a and 25b connect respectively to the pneumatic actuators 41, 43, providing pneumatic power to move the actuator piston and selectably controllable vary the nip action between the nip rolls 33, 35 and the base roll 31.

The metering roll assembly 15 comprises a drive roll 49 and an idler roll 51 urged into coacting pressurized nip relationship on the casing 19 against the drive roll 49 by controllably pneumatic pressure means 53, 55 and a conventional mechanical linkage 57. A circumferential groove 59 is provided in the peripheral circumferential surface of one of the metering rolls 51 to define an air passage in the nipped casing and thus permit equalization of the shirring zone inflation pressure across the metering roll assembly 15.

Inflation air supplied to the mandrel 21 through the inflation blocks 23 is fed alternately continually into the casing at mandrel tip 29 and inflates the casing up to the desired shirring pressure within a zone bounded at one end by the shirring head 27 and at the other by the pressure regulating station 13.

The extent to which the inflation pressure in the zone immediately to the left of pressure regulating station 13 is maintained lower than the inflation pressure in the shirring zone is determined, for any preselected linear rate of speed of casing advance, by the respective nipping actions of the nip rolls 33, 35 on the casing 19 against the base roll 31, as will be described more fully hereinafter with reference to FIGS. 4, 5, and 6 of the drawings. FIG. 3 of the drawings also shows a casing holdback means 47 to the right of shirring head 27, which continually holds back the just shirred casing to compact it and advance it along the mandrel 21.

Figure 5:
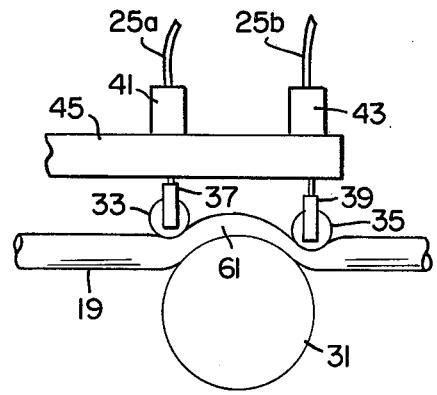
Figure 6:
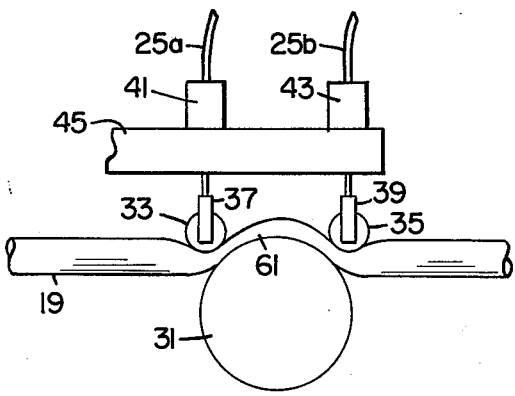

In FIGS. 4, 5, and 6 a casing 19 in process is shown passing from a zone of low inflation pressure at the left of these drawings, through a pressure regulating station 13, to a zone of high inflation pressure at the right of the drawings. In FIG. 4, the nip pressure between nip roll 33 and base roll 31 is high while the nip pressure between nip roll 35 and the base roll 31 is low. This operating condition is attained by pneumatic control action which extends the piston and shaft of actuator 41 and concurrently retracts the piston and shaft of actuator 43. An inflation gas accumulation chamber 61 is thus defined in the casing 19 between the full nip at the rolls 33, 31 interface and the partial nip at the rolls 35, 31 interface. The pressure in accumulation chamber 61 for the condition shown in FIG. 4 is equal to the pressure obtaining in the high inflation pressure zone at the right of the drawings, since the accumulation chamber is open to this zone. This operating condition illustrated in FIG. 4 is maintained with the nip roll 33, base roll 31 nip providing an interzone seal for as long as the desired pressure differential between the zones obtains.

When the low inflation gas pressure in the zone to the left in the drawings, drops to or through a preselected level to be maintained, the pneumatic control system is actuated to extend the piston and shaft of actuator 43, urging nip roll 35 into full or high nip pressure contact on the casing against base roll 31. This closes accumulation chamber 61 with a quantity of high pressure inflation gas therein trapped. Nip roll 33 is then retracted by pneumatic actuator 41 to the position shown in FIG. 5, to a low nip or open condition, releasing the trapped quantity of high pressure inflation gas from accumulation chamber 61 into the low pressure zone at the left of the drawing FIGURE. This operational sequence is repeated as frequently and as rapidly as operating conditions may require to bring the low pressure zone up to the desired pressure and reattain the desired interzone pressure differential, at which time the condition illustrated in FIG. 4 resumes.

With the additional step of controllably varying the spacing between the nip rolls 33, 35, the operating sequence described above can be reversed. Starting from the operating condition shown in FIG. 5 the accumulation chamber 61 is closed by bringing nip roll 33 into full nip on the casing against base roll 31, trapping a quantity of low pressure inflation gas therein, the spacing between nip rolls 33, 35 is decreased, decreasing the volume of the accumulation chamber 61 and compressing the gas therein nip roll 35 is retracted to the position shown in FIG. 4 to a low nip or open condition, and the trapped quantity of now compressed gas from accumulation chamber 61 is forceably passed or pumped into the high pressure zone at the right of the drawing figure. The pumping rate and the gas pressure differential attainable between the zones is a function of the speed of advance of the casing 19 and the sequential interacting operating rates of the apparatus components.

FIG. 6 illustrates operation with less than full nipping action by both the nip rolls 33, 35, a condition wherein the accumulation chamber 61 is not tightly closed at either end and wherein the inflation gas will tend to bleed down from the high pressure zone into the low pressure zone in a continuous throttled flow. In the FIG. 6 mode of operation, the pressure differential attained between the zones for any maintained set of nip pressures is proportional to the speed of casing advance.

It is advantageous to make the surface of one of the rolls of a nipping pair, such as 33–31, and 35–31, or whatever, resilient, and the surface of its coacting roll hard. This makes for good positive nip action and good accumulation chamber definition, and greatly lessens the danger of cutting or marring the casing. The exact sizes and arrangement configurations of the base roll and its associated nip rolls can be varied to meet requirements specific or unique to the material in process, desired pumping rates if pumping up, process speed and other relevant parameters.

It is also possible, and advantageous in certain applications, such as in the pumping up mode described hereinabove, to vary the gap or spaced distance between the nip rolls 33, 35 and consequently vary the size of the accumulation chamber 61 defined between the nip rolls. The nip roll gap or spacing may, with further advantage in particular applications, be made continuously controllably selectably variable towards the attainment of desired pumping rates, bleed down rates, trapped air quantity transfer rates or whatever, as will be readily appreciated, in the light of this disclosure, be persons conversant with the mechanical arts.

In a typical embodiment of the invention designed for collagen casing production and to meet the operational criteria therefor hereinbefore described, the base roll 31 is a 4 inch diameter, 3½ inch wide, ground and polished steel cylinder, and each of the nip rolls 33, 35 is a 1¼ inch diameter, 3¼ inch wide smooth surfaced cylinder of resilient material such as vulcanized rubber, polyurethane, or the like. The materials and construction of the rolls, like the roll dimensions and geometry, can be selected according to particular application requirements.

Nip pressure is also a function of particular requirements and operating parameters. For food casing production applications, a pressure availability of 60 to 80 psig controllably connected to a 1 inch bore cylinder pneumatic actuator is suitable. The magnitude of the pressurized nip between either of the nip rolls 33, 35 on the casing 19 against the base roll 31 normally varies between 8 to 40 psig on a 2 inch bore cylinder. This variation is experienced because casing production operating conditions, particularly in collagen casing production, vary from blend to blend of casing starting material, a circumstance which also inherently affects size control.

When the present invention is used in food casing production applications, it is preferred, and, in most instances essential, that rotational drive force be imparted to at least one of the rolls, usually the base roll 31, comprised in the pressure regulating station 13. It is contemplated, however, that in applications other than those relating to food casing production, rotational driving force need not be imparted to any of the rolls 31, 33, 35 comprised in the pressure regulating station 13, rotational movement being imparted by the advancing tubing itself which may in turn receive its advancing impetus from a drive roll arrangement, a set of metering rolls for instance, elsewhere on the process line.

It is important to note that the invention works equally well with either a high pressure inflation gas fed to the high pressure zone or a low pressure inflation gas fed to the low pressure zone of zones to be controlled. It is also possible, in pumping up at adequate nip pressures and casing advance speeds from a low pressure zone to a high pressure zone fed by a high pressure inflation gas source, to attain in the high pressure zone, an inflation pressure higher than that of the supply source.

FIG. 2 of the drawings shows apparatus according to the invention installed between a low pressure wet treatment zone and a relatively higher pressure drying zone in a casing production system. Inflation gas pressure is increased for the drying step to obtain proper sizing of the casing. In the arrangement shown, a wet, slack casing or tubing 119 is pulled through a pressure regulating station 113 by a metering roll assembly 115 and advanced to the dryer 111. Inflation gas, air for instance, for such an arrangement may be supplied to the low pressure zone at or near the casing extrusion head in the case of cellulose casing production, or, in the case of collagen casing production, to the high pressure zone from a shirring mandrel tip at the end of the line.

Numerous alternative apparatus embodiments and modes of practicing the invention, but well within the spirit thereof, will undoubtedly, in the light of the disclosure, occur to persons conversant with the art. It is therefore intended that the description herein be taken as illustrative only, and not construed in any limiting sense.

What is claimed is:

1. In a system for the production of flexible film tubing which system includes means for continuously introducing an inflation gas into the interior of the tubing and means for continuously unidirectionally advancing the tubing from a first zone to a second zone,
   apparatus to maintain a preselected inflation gas pressure differential between the first zone and the second zone comprising, in combination: A base roll having a substantially flat circumferential surface in contact with the advancing tubing; a first flat nip roll disposed in first tubing nipping relationship relative to said base roll; a second flat nip roll disposed in second tubing nipping relationship relative to said base roll and spacedly adjacent said first nip roll; means to selectably vary the tubing nipping relationship between the first nip roll and the base roll; and means to selectably vary the tubing nipping relationship between the second nip roll and the base roll; whereby a continuous succession of inflation gas accumulation chambers is formed in the advancing tubing between the base roll and the first and second nip rolls, and successive inflation gas quantities in said accumulation chambers are passed from one of said zones to the other.

2. Apparatus according to claim 1 wherein the base roll is a driven roll.

3. Apparatus according to claim 1 wherein the respective circumferences of the first and the second nip rolls are substantially equal.

4. Apparatus according to claim 1 wherein the circumference of the base roll is greater than at least one of the circumferences of the first and the second nip rolls.

5. Apparatus according to claim 3 wherein the circumference of the base roll is greater than the respective circumferences of the first and the second nip rolls.

* * * * *